Jan. 18, 1944.   C. I. HALL   2,339,635
CONTROL SYSTEM
Filed Sept. 18, 1940
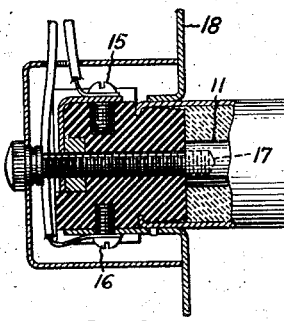
Fig.1.
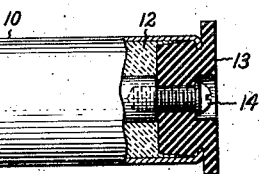
Fig.3.
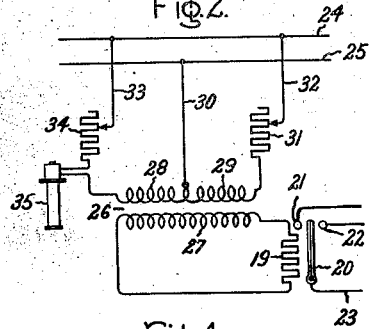
Fig.2.
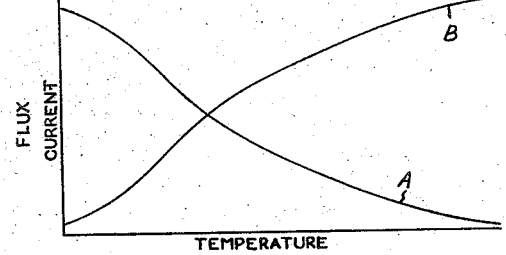
Fig.5.
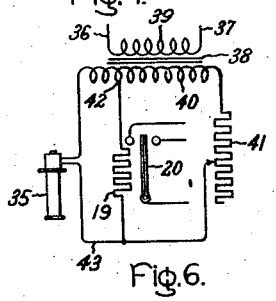
Fig.4.
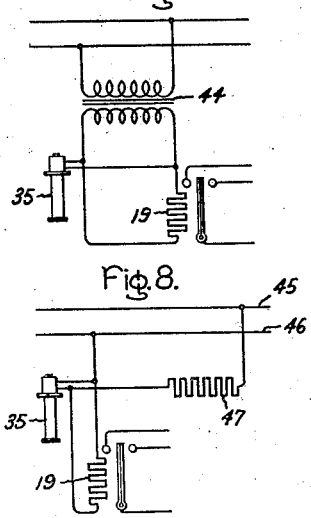
Fig.6.
Fig.8.
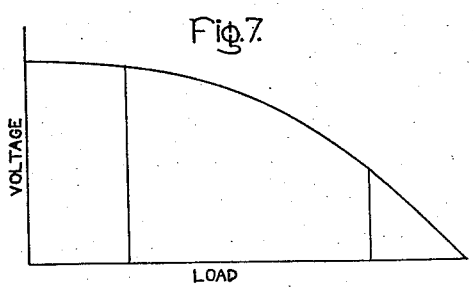
Fig.7.
Inventor:
Chester I. Hall,
by Harry E. Dunham
His Attorney.

Patented Jan. 18, 1944

2,339,635

UNITED STATES PATENT OFFICE 2,339,635

CONTROL SYSTEM

Chester I. Hall, Schenectady, N. Y., assignor to General Electric Company, a corporation of New York Application September 18, 1940, Serial No. 357,295

7 Claims. (Cl. 219—20)

My invention relates to a dual temperature responsive control system and to an inverter arrangement for varying the voltage applied to a thermostat subcalibrating device in response to changes in a second temperature condition, and although not limited thereto, it has particular application to a thermostatic control system wherein the energization of a local subcalibrating heating element of a room thermostat is varied inversely in response to changes in outdoor temperature.

In space cooling it is desirable to vary the temperature inside the space depending upon that out-of-doors. This not only is of physiological benefit to individuals in reducing the heat shock upon entering or leaving the space, but it reduces the demand upon the cooling system with a consequent saving during very hot periods. Therefore, the American Society of Heating and Ventilating Engineers has recommended a so-called sliding differential; 72 degrees F. room temperature at 70 degrees outdoors, and an 80 degree room temperature when the outdoor temperature is 95 degrees. Between these two limits, of course, the temperature inside will change eight degrees as the outdoor temperature varies 25 degrees.

Heretofore, schemes have been used to accomplish this, which include a cooling thermostat sub-calibrated by means of a heater, the heater dissipation and consequent values of sub-cooling being varied by means of a rheostat operated by a bulb and bellows placed outdoors, or by other similar arrangements. Thus, such thermostat subcalibrating arrangements require devices with contacts and moving parts as well as a space to accommodate such devices.

It is therefore an object of my invention to provide an improved negative temperature coefficient resistor arrangement for inversely subcalibrating a thermostat controlling temperature inside a space in response to changes in outdoor temperature.

Another object of my invention is to provide a thermostat subcalibration control arrangement which is simple in construction, efficient in operation and has a minimum of moving parts.

Another object of my invention is to provide a control system, including a thermostat and a local subcalibrating heating element, with an improved arrangement for inversely controlling the amount of energization of the heating element in response to changes in a temperature condition.

A further object of my invention is to provide an improved arrangement for varying the voltage applied to an electrical thermostat subcalibrating device inversely with variations of a condition.

Further objects and advantages of my invention will become apparent from the following description referring to the accompanying drawing, and the features of novelty which characterize my invention will be pointed out with particularity in the claims annexed to and forming a part of this specification.

In the drawing Fig. 1 is a side elevation in partial section of a temperature responsive resistor element the resistance of which varies inversely with temperature; Fig. 2 diagrammatically illustrates an arrangement for employing the resistor element illustrated in Fig. 1 for controlling the energization of a heating element to vary the subcalibration of a room thermostat inversely in response to changes in a temperature condition; Fig. 3 is a diagram which will be employed in describing the operation of the circuit illustrated in Fig. 2; Fig. 4 is a modification of the system illustrated in Fig. 2; Fig. 5 is the diagram which will be employed in describing the operation of the circuits illustrated in Figs. 2 and 4; Fig. 6 illustrates another inverter circuit which may be employed for controlling a thermostatic heating element; Fig. 7 is the diagram which will be employed in describing the operation of the circuit illustrated in Fig. 6; and Fig. 8 is a modification of the circuit illustrated in Fig. 6.

In the arrangements illustrated in the drawing, I have provided an inverse electrical regulating system for employing a temperature responsive device, such as a resistor the resistance of which varies inversely with changes in temperature, for controlling the amount of energization of a heating element which is arranged to subcalibrate a thermostat. In the application of my invention to the control of an air conditioning unit I have employed a resistor having a negative temperature coefficient of resistance, or one the resistance of which decreases as temperature increases, for regulating the energization of the thermostat subcalibrating heating element, since I have found that such a resistor may be built so that its resistance varies appreciably with temperature and therefore no intermediate amplification devices are necessary. Any other type of device may be employed, however, which will inversely affect the characteristics of a circuit upon temperature changes so as to control the heating element directly. Since I desire to have the energization of the thermostatic heating element decreased as outdoor temperature increases and further since the energy absorbed by a resistor having a negative temperature coefficient of resistance increases with increasing temperature, I have employed an improved arrangement for inverting the electrical regulating effect of the resistor element. Thus, I have provided an improved arrangement for subtracting an electrical quantity variable in response to changes in resistance of the resistor element from a constant electrical quantity and then impressing the resultant value on the thermostatic heating element. This is accomplished by subtracting these electrical quantities magnetically, through an induction apparatus, or by subtracting them directly by impressing them in an opposite sense on the thermostatic heating element.

Although my improved arrangement for varying the voltage applied to a device with the variations of a condition finds a convenient application to a thermostatic control device, it will be apparent that my improved arrangement for subtracting electrical quantities may be used in any other system where it is desirable to use an electrical quantity which is the difference between two electrical quantities as described and claimed in my divisional application Serial No. 401,820, filed July 10, 1941.

Referring to the drawing, in Fig. 1 I have illustrated a negative temperature coefficient resistor unit which may be employed with my improved control system. This unit may be of any suitable type, such as a resistor, wherein its resistance varies a sufficient amount with changes in temperature such that it may be employed to control directly the energization of an electrical device, such as a thermostatic preheat coil. I have found that a resistance element having a negative temperature coefficient of resistance will have a sufficient change in resistance per degree change in temperature to effect the desired control. This resistor includes a casing 10 which also acts as one electrode for the resistor, and a center electrode 11. Between the center electrode and the concentric electrode 10 I employ any suitable material 12 the resistance of which will change sufficiently with changes in temperature, such as an electrolite composed of oxides of sodium and silicon. The material is packed into the casing 10 and around the center electrode 11 in a jelly-like highly viscous form. A plug 13 is employed to close one end of the casing 10 and it is held in place by a screw 14 which screws into a hole in the bottom of the electrode 11. At the other end of the resistor there are provided terminals 15 and 16. The terminals 15 may be connected to the center electrode 11 through the screw 17 and the terminal 16 may be connected to the outside casing 10. A bracket 18 may be employed for mounting the unit in a suitable place so that it may respond to changes in a temperature condition. I have found that a resistor made according to that illustrated in Fig. 1 will have a sufficiently great variation in resistance during changes in temperature so that the energization of the thermostatic element may be controlled without the use of any intermediate amplification devices. The resistance of the element illustrated in Fig. 1 will therefore vary in the neighborhood of ten per cent per degree change in temperature. A resistor unit which may be employed in applicant's improved control system is also described in his copending application, Serial No. 327,901 which was filed on April 4, 1940, and which is assigned to the same assignee as the present invention.

In order to control the temperature inside a space when the temperature outside varies from 70 to 95 degrees so that the temperature inside will vary from 72 to 80 degrees, it is necessary when a cooling thermostat is employed in the space, to decrease the inside temperature subcalibrating heating effect of the heating element in the thermostat as the outside temperature rises from 70 to 95 degrees. However, when a temperature responsive device is used outside, the resistance of which decreases as its temperature increases, it becomes necessary to invert the effect of this resistance unit in order to obtain the desired progressive decreasing of the heating effect of the thermostatic heating element as the outside temperature rises. Thus if a resistor having a negative temperature coefficient of resistance were connected in series with an electric device the current flowing through this series circuit would increase as the temperature of the resistance device increases, since the resistance of this later device decreases with increasing temperature. I therefore may invert the effect of the resistor unit with its negative temperature coefficient of resistance in any suitable manner, such as by subtracting a voltage which is proportional to the voltage which is at any instant across the resistor unit, from a constant source of potential. Examples of different ways of accomplishing this subtraction of electrical values will now be described in reference to Figures 2 through 8, inclusive.

Referring to Fig. 2, I have illustrated a circuit which includes a heating element 19 which is arranged so that when it is energized it will heat and thereby subcalibrate a temperature device 20 of any suitable type, such as a bimetallic element that is responsive to a temperature condition such, for example, as room temperature. The bimetallic element is arranged to control any suitable circuit through the contacts 21 and 22 and line 23 which is connected to the bimetallic element 20. Thus, either or both of the contacts 21 and 22 may be employed in the circuit of any suitable device which is to be controlled. Therefore, one of the contacts may be connected to a cooling system, while the other may be connected to a heating system so that the same room temperature responsive thermostat may be used during summer and winter. Furthermore, the change over from cooling to heating is entirely automatic with my invention, as will be described below. In order that the electric heating element 19 may be energized from a suitable source of supply which is indicated by the lines 24 and 25, I provide a transformer 26 the secondary 27 of which is connected in series with the heating element 19. The primary of the transformer is provided with a double winding or with a single winding having a middle tap. Therefore, windings 28 and 29 are provided and connected so that the inductive effect of one on the secondary is opposite to that of the other. Thus, the common terminal of the windings 28 and 29 is connected to the line 25 through a cable 30. The outside end of the winding 29 is connected to the line 24 through an adjustable resistor 31, and a cable 32 so that the inductive action of winding 29 may be varied by adjustment of resistor 31. The outside end of the winding 28 is connected to the same line 24 through a cable 33, an adjustable resistor 34, and a temperature responsive device 35 such as one the resistance of which varies inversely with changes in temperature. Thus the inductive action of the opposing winding 28 is jointly controlled by the adjustable resistor 34 and the negative temperature coefficient resistor 35. The adjustment of resistor 34 modifies and limits the control effected by the temperature responsive resistor 35 in response to temperature changes within a desired range since the resistor 34 becomes proportionately a higher ratio of the total resistance that limits the energization of the opposing winding 28 with the resistor 35 at a higher temperature than at a lower temperature.

Referring now to Fig. 3, I have illustrated diagrammatically curves the abscissas of which are outside temperature and the ordinates of which are current. Taking therefore, for example 95 degrees outside temperature as the top value, the thermostat 20 may be so set as normally to keep the temperature inside the space to be air conditioned at 80 degrees. Furthermore, at this normal thermostat setting, the energization of the heating element 18 may be made substantially zero by relative adjustment of the resistors 31 and 34 so as substantially to balance or equalize the inductive actions of the opposing windings 28 and 29 with resistor 35 subject to the 95-degree outside temperature. Now, as the outside temperature begins to fall below 95 degrees, it will be necessary in order that the thermostat becomes subcalibrated sufficiently to drop the inside temperature 8 degrees as the outside temperature drops 25 degrees to artificially increase the temperature of the thermostat 20 8 degrees above the inside room temperature. This is done by increasing the energization of the thermostatic heating element 19. The desired energization of the thermostatic heating element 19 between 95 and 70 degrees is therefore indicated generally by the line A in Fig. 3. The change of current, however, through the resistance element 35 between the outside temperature limits of 95 and 70 degrees is indicated generally by the line B. Thus, since the resistor element 35 has such characteristics that its resistance increases as the temperature decreases, the current flowing through the element will thereby decrease as its resistance increases or during the time that the temperature decreases. Thus, it will be seen by inspection of these two curves A and B that the effect of a resistor the temperature coefficient of which is negative is just opposite from that which is desired in the control circuit. In order therefore to invert the effect on the circuit of the resistor element 35, I subtract an electrical quantity the change in value of which is proportional to changes in resistance of the resistor element 35 from a constant electrical value, which is indicated by the line C in Fig. 3. Thus, at any value of temperature between 70 and 95 degrees, if the value represented at that moment by curve B is subtracted from the value represented by the line C, a point on curve A will be obtained. This subtraction of electrical values may be accomplished in any suitable manner such as by subtracting currents or voltage drops directly or by subtracting the effect of the currents, or the fluxes produced thereby, in an induction apparatus. The latter method is employed in the circuit illustrated in Fig. 2. Since the element 35 is in series with the winding 28, a change in current flowing through 35 will change proportionally the current flowing through the coil 28. Since flux is produced by ampere turns, the curve B may also serve to indicate the change of flux produced by the coil 28 with temperature changes. Also, since a constant current as limited by the adjustment of resistor 31 is flowing through the circuit including the coil 29, the flux produced thereby may be indicated by the curve C. In this way the adjustment of resistor 31 limits the operating range within which the control of the negative temperature resistor 35 is effected. Therefore, the flux induced in the secondary 27 from the coil 28 will be opposite to the flux produced therein by the coil 29 and the desired subtraction of electrical values is thus accomplished by the double coil primary single coil secondary transformer 25. Therefore, the current at any particular value of outside temperature represented by the curve A will be flowing through the thermostatic heater 19.

In Fig. 4, I have illustrated a circuit wherein the electrical quantities are subtracted directly through an A. C. bridge circuit where the resistor element 35 is connected in one leg and the heater element 19 is connected across the element 35 and a constant source of potential. In order to step down the voltage from lines 36 and 37 to the desirable values, I employ a transformer 38 having a primary winding 39 connected across the lines 36 and 37 and a secondary winding 40. One side of the secondary winding 40 is connected to a variable or adjustable resistor 41, any suitable point 42 is connected to the thermostatic heating element 19, and the other side of the secondary winding 40 is connected to one terminal of the resistor element 35. The other terminal of the resistor element 35 is connected to the other side of the heating element 19 through a conductor 43. This conductor 43 is also connected to the other side of the adjustable resistor 41. The constants of the circuit are set, therefore, such that at 95 degrees outside temperature substantially no current will be flowing through the thermostatic heating element 19. This may be accomplished by so proportioning the characteristics of the circuit that at 95 degrees the voltage drops through the resistor 35 and bias resistor 41 are such that there is substantially no potential difference between the ends of the heater 19. Now as the outside temperature begins to fall, the resistance of the element will increase and thus decrease the current flowing through the element 35, so that the resultant current passing through the heater 19 will increase.

In order to illustrate that the above described arrangement of subtracting two electrical quantities has a wide application, I have illustrated in Fig. 5 the relation between two quantities such that a change in phase of resulting quantity may be obtained by merely varying the relative distances between the values indicated by curve B, which indicates the changes in electrical quantity of the circuit including the resistor unit with the negative temperature coefficient, and by the curve C which indicates the constant bias electrical quantity. It thus becomes possible to reverse the slope of a control circuit curve A or to reverse the direction of energy flow at any desired point by a variation between the fixed bias value and the variable value.

The following are values of the different elements in the circuit illustrated in Fig. 4 which I have found to give the desired characteristics when my invention is employed for the control of air cooling equipment. Assuming 110 volts, 60 cycles impressed across the primary winding of the transformer and 24 volts across the secondary, the thermo-sensitive element will have a resistance change from approximately 35 to 830 ohms during the temperature change of 70 to 95 degrees, the bias resistor 41 will be set for approximately 106 ohms, the thermostat heater 19 will be set for approximately 42.3 ohms. The point 42 will be at the four volt tap.

It is also to be noted that by employing elements the relative values of which are made according to those above stated, the resistor will have what I call a "taper of sensitivity." Thus, between 70 and 95 degrees, the energization of the thermostatic heating coil will vary considerably with changes in temperature. However, above 95 degrees and below 70 degrees there will only be relatively very slight changes in energization per degree change in temperature. This may be seen from an inspection of Fig. 3, where it will be seen that the curve A approaches asymptotically the temperature axis at relatively high temperatures and it also approaches asymptotically the value indicated by the curve C at relatively low temperatures. This taper feature is very desirable since the same thermostat 20 may also be employed in the wintertime to control the heating equipment. Thus, when it is desired to go from cooling to heating this may be accomplished automatically since the energization of the resistor coil 19 will have very little effect relatively on the thermostat below 70 degrees.

In Fig. 6, I have illustrated another arrangement for inverting the effect of the negative temperature coefficient resistor by employing a transformer 44 which has poor regulation. In other words, the transformer has such characteristics that as the load is increased in the secondary, the voltage across the secondary will become proportionately less. The curve representing the characteristics of such a transformer is indicated in Fig. 7. Thus, the resistor 35 with the inverse temperature coefficient is placed across the thermostatic heating element 19. The circuit may also be set so that at 95 degrees outdoor temperature, practically zero energization will be present in the element 19. Therefore, when the temperature reduces outside, the resistance of the resistor 35 increases, thus decreasing the current flowing through the element 35. This causes the load across the transformer 45 to be lessened so that a larger voltage will be present across the heating element 19 which will in turn cause greater energization of the element.

I have illustrated in Fig. 8 a circuit quite similar to that illustrated in Fig. 6. Thus, the thermostatic heating element 19 is connected across the resistor element 35 and this parallel circuit is in turn connected across the lines 45 and 46 in series with a resistor 47 which may be adjustable. Here again the circuit characteristics may be so set that at 95 degrees outdoor temperature substantially no current will be flowing through the heating element 19. However, as the outdoor temperature decreases the resistivity of the element 35 will increase, thereby increasing the potential available at the terminals of the preheat coil 19.

In view of the foregoing, it will be seen that I have provided an improved system for varying the voltage applied to any suitable device inversely with the variation of a change in a condition. Thus, I may invert the effect of a change in an electrical quantity by subtracting this quantity from a constant quantity and impress the resultant on the device which is to be controlled. Therefore, when my improved control arrangement is applied to a thermostatic control system, I may control the heating effect of a thermostatic heating element through a resistance element the resistance of which decreases with increasing temperature. Furthermore, by employing a resistor element the resistance of which varies considerably with changes in temperature, such as in the neighborhood of 10 per cent per degree, I am able to control directly the energization of the heating coil without the use of any intermediate amplification devices.

Although I have shown and described particular embodiments of my invention, I do not desire to be limited to the particular embodiments described, and I intend in the appended claims to cover all modifications which do not depart from the spirit and scope of my invention.

What I claim as new and desire to secure by Letters Patent of the United States is:

1. A dual temperature responsive control system including a thermostatic control device responsive to one temperature condition, a local electric heater for subcalibrating said device, an electric current controlling resistor having a negative temperature coefficient of resistance and responsive to another temperature condition, and electric current inverting means interconnected with said resistor for decreasing the energizing current of said heater upon an increase in the current controlled by said resistor.

2. A thermostatic control system including a temperature responsive device responsive to a temperature condition, a source of electric potential, an electric heating element, said element being arranged to supply heat to said temperature responsive device upon energization from said source, a resistor responsive to a second temperature condition and having a negative temperature coefficient of resistance, a transformer having two primary windings and a secondary winding, means for connecting one of said primaries to said source and to said resistor and the other of said primaries of said source, said primaries being so connected and disposed that the currents induced therefrom in the secondary flow in the opposite directions, said heating element being connected to said secondary winding so that the energization of said element is controlled according to variation of said second condition.

3. A dual temperature responsive control system including a thermostatic control device responsive to one temperature condition, a local electric heater for subcalibrating said device, an electric current controlling resistor having a negative temperature coefficient of resistance and responsive to another temperature condition, and transformer means for energizing said heater having a control winding connected to be controlled by said resistor for varying the energization of said heater inversely in response to variations in said other temperature condition.

4. A thermostatic control system including a temperature responsive device responsive to a temperature condition, a source of electric potential, an electric heating element, said element being arranged to supply heat to said temperature responsive device upon energization from said source, a transformer having two primary windings connected in series, means for connecting the common sides of said primaries to one side of said source, and means for connecting the other side of one of said primaries to the other side of said source through an adjustable resistor and a resistor having a negative temperature coefficient of resistance, means for connecting the other side of said other primary to said last mentioned side of said source through an adjustable resistor, and means for impressing the voltage appearing across said secondary across said heating element.

5. A thermostatic control system including a temperature responsive device responsive to a temperature condition, a source of electrical potential, an electric heating element, said element being arranged to supply heat to said temperature responsive device upon energization from said source, a transformer having a primary winding and a secondary winding, means for connecting said primary across said source, a resistor responsive to a second temperature condition and having a negative temperature coefficient of resistance, an adjustable resistor, said heating element having connection at one side to said secondary between its ends and connection at its other side to one end of said secondary through said adjustable resistor, said resistor with the negative temperature coefficient being connected across said element so that energization thereof is controlled in response to variations in said second temperature condition.

6. A dual temperature responsive control system including a thermostatic control device responsive to one temperature condition, a local electric heater for sub-calibrating said device, an electric current controlling resistor having a negative temperature coefficient of resistance and responsive to another temperature condition, and electric transformer means having opposing windings for energizing said heater with one of said windings connected to be controlled by said resistor for varying the energization of said heater inversely in response to variations in said other temperature condition within a predetermined range.

7. A dual temperature responsive control system including a thermostatic control device responsive to one temperature condition, a local electric heater for subcalibrating said device, an electric current controlling resistor having a negative temperature coefficient of resistance and responsive to another temperature condition, electric transformer means having opposing windings for energizing said heater with one of said windings connected to be controlled by said resistor for varying the energization of said heater inversely in response to variations in said other temperature condition within a limited range, and means for controlling the other of said windings to limit said range.

CHESTER I. HALL.